March 4, 1952 M. A. CHAVANNES ET AL 2,587,594
PROCESS FOR MAKING DECORATIVE SHEET-LIKE ARTICLES
Filed Oct. 31, 1946 3 Sheets-Sheet 1

INVENTORS
Marc A. Chavannes
and Leon E. Magoon
BY
ATTORNEY

March 4, 1952 M. A. CHAVANNES ET AL 2,587,594
PROCESS FOR MAKING DECORATIVE SHEET-LIKE ARTICLES
Filed Oct. 31, 1946 3 Sheets-Sheet 2
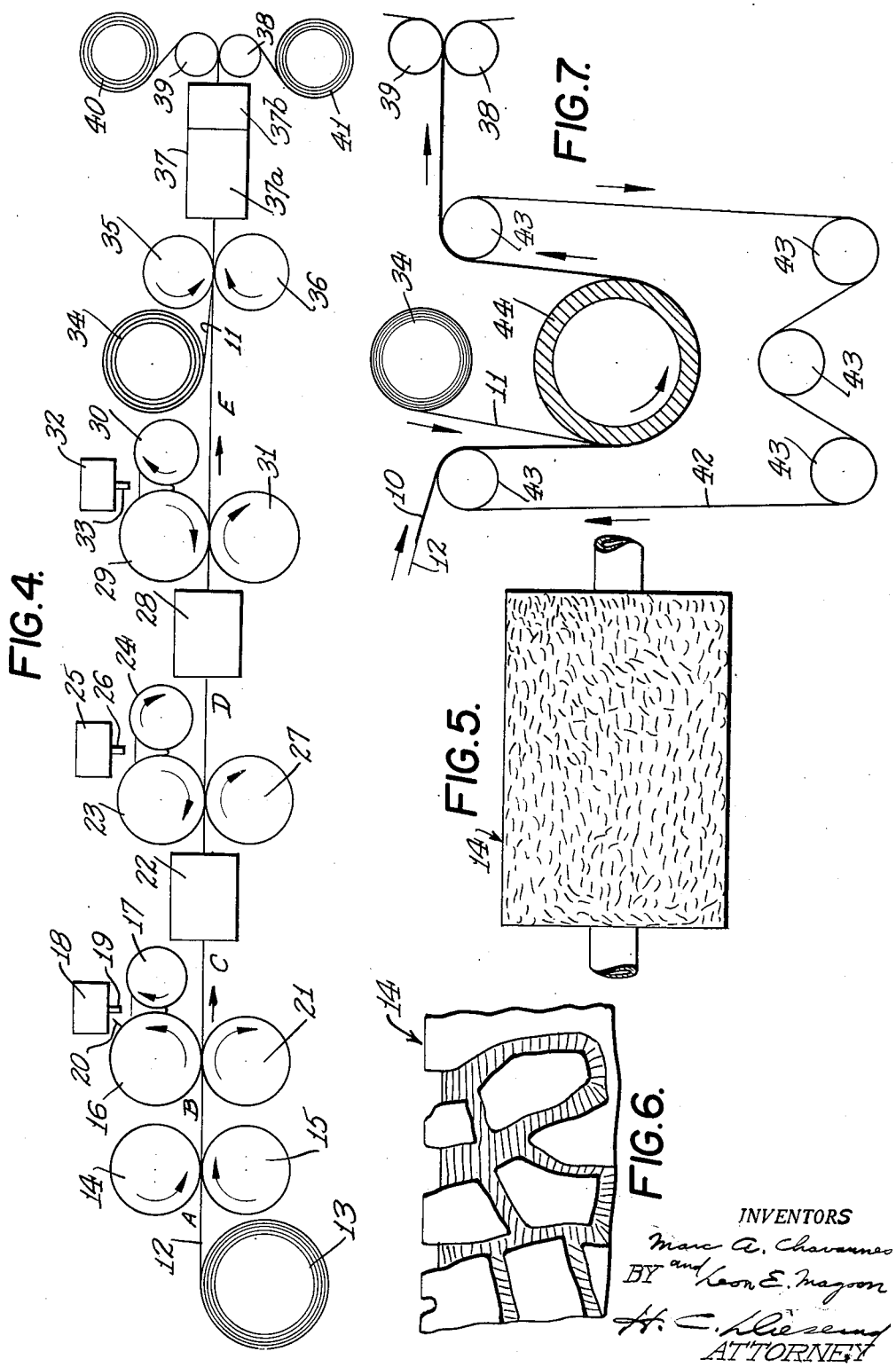
INVENTORS
Marc A. Chavannes
and Leon E. Magoon
BY
H. C. Riesen
ATTORNEY March 4, 1952　　　M. A. CHAVANNES ET AL　　　2,587,594
PROCESS FOR MAKING DECORATIVE SHEET-LIKE ARTICLES
Filed Oct. 31, 1946　　　　　　　　　　　　3 Sheets-Sheet 3

INVENTORS
Marc A. Chavannes
and Leon E. Magoon
BY
H. E. Liesegang
ATTORNEY

Patented Mar. 4, 1952

2,587,594

UNITED STATES PATENT OFFICE 2,587,594

PROCESS FOR MAKING DECORATIVE SHEET-LIKE ARTICLES

Marc A. Chavannes, Lisbon, and Leon E. Magoon, Pachaug, Conn., assignors, by direct and mesne assignments, to Chavannes Industrial Synthetics, Inc., New York, N. Y., a corporation of Delaware Application October 31, 1946, Serial No. 707,022

5 Claims. (Cl. 18—61)

This invention relates to a process for producing a flexible sheet or web having surface irregularities in relief and intaglio conforming with a predetermined design.

Articles which may be produced in accordance with the teachings of the present invention are varied. For example, it is possible to produce a sheet-like article comprising a layer of plastic or other resinous material having on one surface elevated and depressed regions defining a pattern, such as a reptile-skin effect. The other surface of the plastic layer may be bonded in accordance with the teachings of the present invention to a fabric layer, for reinforcing purposes. Such an article is quite useful and decorative, as upholstery for example or the like.

Instead of a reptile-skin effect, an unlimited variety of other effects may be produced, such as fabric-like, or pebble-grained surfaces, artistic designs, and geometric designs, including lettering, if desired. The resinous sheet may be produced without the above-mentioned fabric, if desired.

In one embodiment of the product of the present invention, a sheet is produced having a surface which, in addition to having patterns in relief and intaglio, is colored differently in different portions. The color variations may be related to the variations in elevation of the surface. Thus, using the reptile-skin effect again as an example, the surface may be dark-colored on the high points and light-colored in the low points, or the reverse may be true.

One object of the present invention is to provide a flexible sheet, particularly a thin plastic film, having surface irregularities defining a predetermined pattern. A feature of the plastic films produced in accordance with the present invention is that they are relatively free from internal mechanical stresses.

A further object is to provide such a sheet bonded to a flexible web. One method of bonding a thermoplastic resinous sheet to a fabric is by heat sealing. In case it is desired to heat seal one surface of a resinous sheet to a fabric web and the sheet has a pattern in relief and intaglio on the other surface, it is a serious problem to accomplish the seal without destroying the pattern as a result of the combination of heat and pressure, together with the thermo- plastic character of the sheet. An important feature of the present invention is that the bonding of the plastic sheet to the web may be accomplished without injuring the pattern on the surface.

A still further object of the present invention is to provide a flexible sheet having in combination with surface irregularities, variations in color in various regions in accordance with a predetermined pattern. One problem in connection with such a sheet is the effect of wear or abrasion on the color patterns; that is, the question of whether the color on the high points of the sheet will disappear when these points are slightly worn away. An object of this invention is to avoid this difficulty, providing a sheet of this type which will retain the color pattern in spite of considerable wear of the high points.

Further objects and features of the present invention are represented by a wide variety of other effects which may be produced. Thus the surface of the film may be given a very fine pattern of small irregularities in relief and intaglio, combined with large or small colored patterns. In another embodiment, there may be a design in relief and intaglio coinciding with certain portions of the colored pattern. In still other embodiments the film may be made thick in some regions and thin in others, with interesting optical effects. Also, variations in thickness produced on one surface of the film may be used in connection with certain chemical processes referred to herein to produce additional patterns in relief and intaglio by chemical means on the other surface of the film.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein Fig. 1 is a photolithographic plan view of an article which may be produced by the teachings of the present invention, showing the exposed surface of a layer of plastic material, having irregularities in the elevation of the surface and also variations in the color of the surface in accordance with a predetermined pattern, so as to provide an appearance similar to that of a two-toned reptile skin.

Fig. 4 is a schematic elevational view of one embodiment of apparatus which may be used to make such a sheet as that shown in Figs. 1 and 2.

Fig. 5 is an elevational view of an embossing roller which may comprise a part of the apparatus shown in Fig. 4.

Fig. 6 is a greatly enlarged elevational view of a portion of the roller shown in Fig. 5, near the upper boundary of said roller.

Fig. 7 is a schematic elevational view of apparatus which may be substituted for certain portions of the apparatus shown in Fig. 4, for bonding fabric to the smooth side of the film.

Fig. 8 represents the carrier before embossing.

Fig. 9 represents the carrier after it is embossed.

Fig. 10 represents the embossed carrier after application of a film-forming substance to high points thereof.

Fig. 11 represents the elements shown in Fig. 10 after having had a continuous layer of film formed thereover.

Fig. 12 represents elements shown in Fig. 11 together with another layer of film-forming substance, which is still in the fluid condition.

Fig. 13 represents the elements shown in Fig. 12 together with a fabric web applied thereto, the film-forming substance having been subsequently dried.

Figure 1:
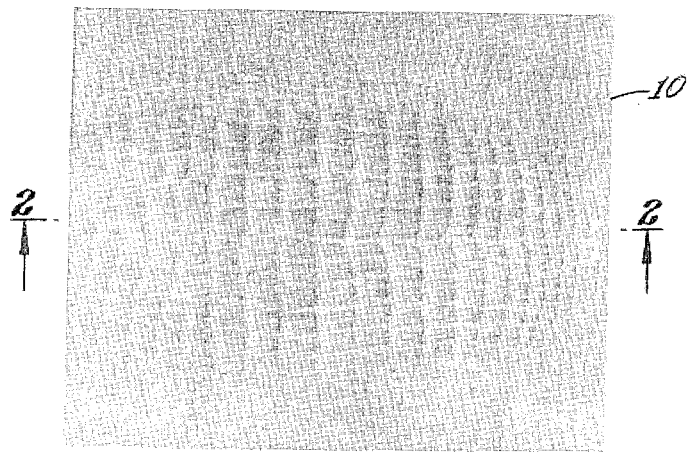
Figure 2:
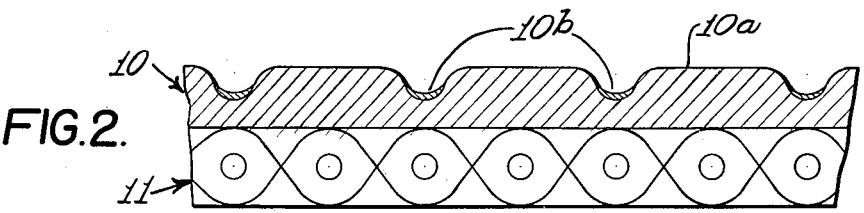
Fig. 2 is an enlarged cross-sectional view, with exaggerated thickness, of the article shown in Fig. 1, including a plastic sheet with an exposed two-toned surface and a fabric reinforcing web bonded to the other surface of the plastic sheet, the section being taken through the plane 2—2 indicated in that figure.

It may initially be assumed, for example, that it is desired to produce a sheet such as that illustrated in Figs. 1 and 2. This sheet may be considered to comprise a plastic portion 10 bonded to a fabric portion 11. The plastic portion is provided on the exposed side shown in Fig. 1 with surface irregularities in relief and intaglio in accordance with a predetermined pattern, in the present case, one corresponding to a reptile skin. On the high points of this side, such as in regions 10a, the surface appears dark in color. On the low points of this side, such as regions 10b, this surface appears light in color. This contrast in appearance is quite decorative, and should be maintained regardless of wear, if possible. From an examination of the cross-sectional view shown in Fig. 2, it is apparent that in the low regions 10b there are embedded portions of film, in this case light-colored, and that these embedded portions extend only to a limited depth from the exposed surface. On the other hand, the portions of the film in the high regions 10a are actually part of the main body of the film, and the color seen is the true color of the film. When the sheet is subjected to normal wear, minute portions of the high regions are removed or worn away, but relatively little wear occurs in the low regions. As a consequence of the construction shown in Fig. 2, the color pattern is not destroyed when small portions of the high regions are worn away, since these regions are the same color for the complete depth of the plastic film or sheet.

Reference may be made to Fig. 4 for a description of a process and apparatus which may be used to produce such an article as that shown in Figs. 1 and 2. This apparatus makes use of a continuously advancing carrier 12. One of the features of the present invention is that the carrier is embossed. It may be embossed prior to its use in the present apparatus, or means for embossing the carrier may be provided as part of this apparatus. The carrier should be flexible and should provide a surface from which the film to be formed thereon may be readily stripped. One type of satisfactory carrier may be formed by first applying to a base web of paper a substance which will give to the paper a smooth, hard surface which will not be damaged by diluents or other substances to be used in the film to be formed thereon, and which also will not be appreciably damaged by heat in the ovens through which it must pass during the process. For this purpose the paper may be treated with some substance such as melamine, modified alkyds, varnish, nitrocellulose, lacquer, proxylene, casein, glycerine, polyvinyl alcohol, shellac, rubber, gums or the like, or a combination of such substances. After this coating has been dried, the carrier is embossed so that the side bearing the above-mentioned permanently-adhering coating corresponds to the negative of the surface shown in Fig. 1; that is, the coated carrier surface has a depression in regions where it is desired that the surface shown in Fig. 1 is to have a high point.

In the apparatus shown in Fig. 4, it is assumed that the carrier 12 has already received its hard, permanently-adhering coating prior to the present process, but has not yet been embossed. This carrier may be carried by a reel 13, and may be drawn from this reel by a pair of cooperating embossing rollers 14 and 15. As the carrier 12 enters the nip of these rollers, it may be considered to have its hard, permanently-adhering coating on its upper side. The rollers 14 and 15 may be of metal, roller 14 being a male roller and roller 15 a female roller. Fig. 5 is an elevational view showing schematically the embossing roller 14. Fig. 6 is a greatly enlarged elevational view near the upper boundary of this roller, showing its surface irregularities. Other arrangements may alternatively be used; for example, roller 14 may be a male metallic roller and roller 15 may be of some yielding material such as rubber.

It is to be understood that the carrier is not necessarily restricted to a paper construction. Thus an embossed metallic carrier could be used. In this case it would probably be in the form of an endless belt, instead of in the form of a web such as is used in the present illustration.

Figure 8:
Figs. 8–13 are sectional views showing various stages of forming, by the herein-discribed embossed carrier method, a film having a two-toned irregular surface and a fabric backing layer.
Figure 9:
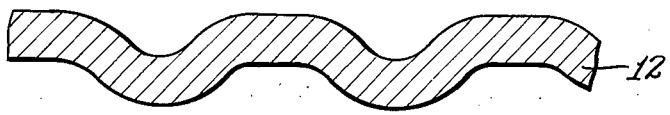

Reference may be made to Figs. 8–13, which illustrate various steps in the process, with special reference to Figs. 8 and 9. The previously-applied permanently-adhering coating of the carrier is not shown in these figures for convenience, but may be assumed to be present. In Fig. 8 the carrier is shown before being embossed, as at station A of Fig. 4. In Fig. 9 the carrier is shown after having been embossed, as at station B. In case a two-toned effect is desired, as shown in Figs. 1 and 2, there is now applied to only the high points of the embossed carrier a film-forming substance of a color which will contrast with the color of the substance to be used for the main body of the film.

The substance applied to only the high points of the carrier may be a solution, dispersion, emulsion or organosol of a resin in a fluid vehicle. The vinyl resins, especially copolymers of vinyl acetate and vinyl chloride, may be satisfactorily used in this connection. It is to be noted that the main body of the film should preferably be formed from a dispersion, emulsion or organosol, but preferably not from a solution, in order to produce a film free from holes and weak spots.

A satisfactory substance to be applied to the high points of the carrier may comprise a vinyl resin such as a copolymer of vinyl acetate and vinyl chloride, or a similar product, a plasticizer such as dioctyle phthalate, a solvent such as methyl ethyl ketone, and a pigmenting material such as titanium dioxide. A satisfactory copolymer of vinyl acetate and vinyl chloride for this purpose is one comprising approximately 90% vinyl chloride and 10% vinyl acetate by weight and having an average molecular weight of approximately 18,000. A satisfactory example of such a substance is presently sold by Carbide and Carbon Chemicals Corporation under the trade mark "VYNS." The titanium dioxide, which is white, will cause the resinous material applied to the high points of the carrier to be light-colored. It has been assumed in the present example that it is desired to produce a finished film having dark-colored high points and light-colored low points. It is to be noted that the high points of the carrier will eventually correspond to the low points of the film surface. If a dark-colored film-forming substance is used for the main body of the film in connection with the light-colored substance applied to the high points of the carrier, the desired results will therefore be obtained.

The substances mentioned have satisfactorily been combined in the following proportions:

| | Parts by weight |
|---|---|
| Vinyl acetate-chloride copolymer (VYNS) | 100 |
| Dioctyle phthalate | 33 |
| Methyl ethyl ketone | 1000 |
| Titanium dioxide | 50 |

Figure 10:
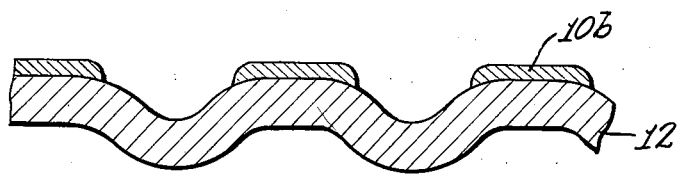

Appropriate means are provided for applying such a film-forming solution to the high points of the carrier. In the present example there is provided above the carrier and lightly touching the upper regions of same a metallic roller 16. This roller may be lightly etched or roughened so as to have minute irregularities therein capable of holding small quantities of ink or dispersion. To the right of and cooperating with this roller is a doctor roller 17, which, together with the roller 16, forms a trough for holding the dispersion, ink, or other film-forming substance to be applied to the carrier. Means not shown are provided for damming up the ends of the trough. The solution may be supplied to this trough from a mixing vat 18 through a pipe 19. The roller 16 may in the present example rotate counterclockwise and the doctor roller 17 may rotate clockwise. It is observed that the roller 17 does not contact the carrier. As a result of the cooperation of the rollers 16 and 17, a coating of solution is applied to the roller 16. A doctor blade 20 is provided for removing excess solution from the roller 16. Underneath the carrier and opposed to the roller 16 is a backing roller 21, which may conveniently be of smooth, metallic construction. This roller rotates clockwise and aids in advancing the carrier. Pressure between the rollers 16 and 21 is very light in order to avoid flattening out the embossed carrier. The separation of these rollers is so adjusted that a coating of solution is applied to only the high points of the carrier 12. Reference may be made to Fig. 10 which shows the embossed carrier 12 to the high points of which there have been applied portions 10b of film-forming substance. This figure represents conditions prevailing at station C of Fig. 4.

The carrier is then passed through a drying oven 22, or is subjected to other drying means.

A continuous coating of a film-forming dispersion, in the present case of a darker color than the first-applied substance, is now applied over the carrier.

An additional reason, in case a two-toned film is being produced, for using a dispersion for the main body of the film instead of a solution is the fact that there is virtually no tendency for a dispersion to dissolve the film-forming substance first applied, thus avoiding the destruction of the color pattern, which would probably result from applying a solution coating at this stage.

One may satisfactorily employ in the first-applied substance a copolymer having a somewhat lower average molecular weight than that to be used in the main body of the film. The reason for this is that the solution applied to the high points should have a high solid content and yet be quite fluid, a condition more easily obtained when using a copolymer of relatively low molecular weight.

In some cases, particularly where a two-toned effect is not desired, the film may be formed from two or more successive layers of the same dispersion, omitting the step of applying a film-forming substance to only the high points of the carrier.

The film-forming substance of which the main body of the film is formed will, as stated, be in general a dispersion, emulsion or organosol of a resin in a fluid vehicle. In the present example it may be assumed that there will be used a dispersion of a copolymer of vinyl acetate and vinyl chloride, a plasticizer, diluents and a pigment. The diluents may, as in the specific example given below, comprise a relatively high-boiling diluent and a lower-boiling diluent. The vinyl acetate-chloride copolymer for this purpose may conveniently comprise approximately 95% vinyl chloride and 5% vinyl acetate, and may have a molecular weight of approximately 24,000. A satisfactory example of such a copolymer is one presently sold by Carbide and Carbon Chemicals Corporation under the trade mark "VYNV-1." Dioctyl phthalate is a satisfactory plasticizing agent. Xylol may satisfactorily be used as a relatively high boiling diluent, or instead of xylol there may be used a treated petroleum solvent comprising approximately 80% aromatics and 20% aliphatics, having a boiling range approximately as follows: 5%, 138° C.; 95%, 168° C. An example of such a solvent is a solvent presently sold by Standard Oil Company of New Jersey under the trade mark "Solvesso." As a lower boiling diluent there may be used a petroleum distillate having an aromatic content of approximately 9½% and having a boiling range approximately as follows: 5%, 123° C.; 95%, 165° C. An example of such a diluent is the solvent presently sold by the Anderson-Pritchard Oil Company under the trade mark "Apco" thinner. Carbon black may be used as a pigment. These substances have been successfully combined in the following ratio:

| | Parts by weight |
|---|---|
| Vinyl acetate-chloride copolymer (VYNV-1) | 1000 |
| Dioctyl phthalate | 500 |
| Xylol or Solvesso | 200 |
| Apco | 400 |
| Carbon black | 100 |

In a manner well known in the art, to prepare a dispersion of the above substances, the various components are milled together in a ball or pebble mill for a considerable length of time and at a controlled temperature. The time of grinding and the optimum temperature will be determined by the nature and ratio of the components. As an example, grinding for about 24 hours may be necessary, and for some mixtures the temperature should be about 100° F.

A reverse roller coater of the type illustrated may be used satisfactorily for applying the dispersion which will form the main body of the film. There may be provided a smooth, metallic roller 23, rotating clockwise, above the carrier, and a similar roller 24 on the right thereof, also rotating clockwise. The roller 23 touches the upper surface of the carrier, and is wiped across same, but the roller 24 does not contact the carrier. Rollers 23 and 24 are very slightly separated, and together they may form a trough for holding film-forming substance to be applied to the carrier. This substance may be supplied to the trough from a mixing vat 25 through a pipe 26. Underneath the carrier and opposed to the roller 23 is a rubber-coated roller 27 which rotates clockwise and advances the carrier. As a result of a cooperation of the rollers 23 and 24, a coating of dispersion is applied to the roller 23, and is applied by this roller as a continuous coating to the carrier so as to extend over the previously applied portions of film-forming material.

Figure 11:
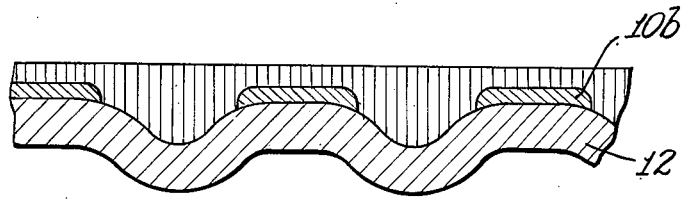

Reference may be made to Fig. 11, which shows the embossed carrier 12 bearing the portions 10b of light-colored film-forming solution and a first continuous coating of dark-colored film-forming dispersion thereover, as at station D of Fig. 4.

The carrier may then be passed through a drying oven 28. A second layer of dispersion similar to the last-applied layer is then applied by suitable coating means, such as another reverse roller coater, including a set of cooperating rollers 29, 30 and 31. Dispersion may be supplied to this coating means from a mixing vat 32 through a pipe 33.

Figure 12:
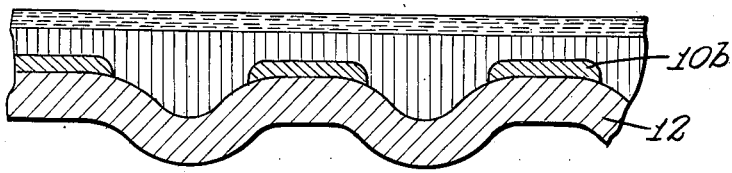

Reference is made to Fig. 12 which corresponds to the conditions prevailing at station E of Fig. 4. In Fig. 12 there is shown the embossed carrier 12 bearing the portions 10b of light-colored film-forming substance on the high points of the carrier, and the two layers of dark-colored film-forming substance thereover. It is observed that the upper layer of dark dispersion is still wet. Eventually these two layers, when dried, will merge into one integral layer. Under some circumstances it may be possible to omit the application of the last layer of dispersion and the drying oven 28, merely using a smooth thicker first continuous layer. It has been found, however, that it is more satisfactory to form the film from a plurality of layers rather than from a single thick layer. It is necessary that the film be of sufficient thickness that the variations in elevation of the carrier do not produce weak spots in the film, and the necessary thickness can best be obtained by the application of successive layers.

Reference is again made to the illustrative process. While the last-applied layer of dispersion is still wet, a layer of a fabric is applied in a superposed position thereto. This fabric 11 may be carried by a reel 34, as shown in Fig. 4. It is drawn from this reel and, with the carrier, advanced by a pair of cooperating guide rollers 35 and 36.

Figure 13:
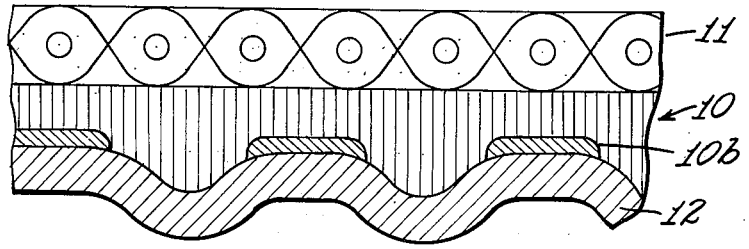

The carrier and its various layers is then passed through an oven 37 with drying and fusing sections 37a and 37b. The various plastic portions then becomes fused together and bonded to the fabric. Fig. 13 shows the carrier bearing the completed article, before stripping.

The carrier and its layer are then passed through a pair of stripping rollers 38 and 39, where the finished fabric-backed film is stripped from the coated carrier, the former being wound upon a reel 40 and the latter upon a reel 41. The finished article is shown in Figs. 1 and 2.

Instead of applying the fabric 11 by means of the rollers 35 and 36, other means could be used, such as the means illustrated in Fig. 7. In this case, after reaching station E of Fig. 4, the carrier bearing its coatings of film could be passed through a conventional drying oven, not shown. It may then be passed into apparatus such as that shown in Fig. 7. This apparatus may be provided with a belt 42 carried by a series of guiding and tensioning rollers 43, and passing around a heated roller or drum 44. The carrier 12 bearing the film 10 may be passed over one of the guide rollers 43 and around the heated roller 44. From the reel 34 the fabric 11 will be fed between the film 10 and the roller 44 and around this roller. The belt 42 will also pass around the roller 44 and serve to exert pressure of the film 10 against the fabric 11. The combination of heat and pressure will cause the fabric 11 to become bonded to the film 10. After leaving the roller 44, the carrier, film and fabric may pass over another guide roller 43 and leave the belt 42. Stripping rollers 38 and 39 may be used as previously described to separate the carrier from the film and fabric. One advantage of this system is that since the film is in contact with the embossed carrier at the time heat and pressure is applied, the carrier causes the film to retain its shape, even though it may be slightly softened temporarily.

Figure 3:
Fig. 3 is an enlarged cross-sectional view with exaggerated thickness of a film or sheet of resinous material which has a single-colored appearance from its surface and which is not bonded to a fabric reinforcing web.

It is obvious that the application of a fabric web could be omitted altogether in case it is desired to produce a film without such a reinforcing layer. If, in addition, the step of applying a differently colored film-forming substance to high points of the carrier is omitted, the results will be a uniformly colored film having an irregular surface, such as that illustrated in Fig. 3.

It has been found that films formed from fluid film-forming substance on an embossed carrier, as herein described, are relatively free from internal stresses, such freedom being desirable.

If a film is produced without the fabric layer, having thick regions and thin regions, and if the depressions in the film are sufficiently great, the film may be so thin there that appreciably greater light will be transmitted through these regions than is transmitted through the thicker regions of the film, with an apparent two-toned effect.

In a different embodiment of the present invention, the carrier is embossed so as to cause the layers of film-forming substance applied thereover to be relatively thick in certain regions and relatively thin in other regions. A swelling agent of the type described in patent application Serial No. 635,982 now Patent No. 2,575,046 of Chavannes et al. is applied to the exposed surface of the film. As a result, undulations are produced in varying degree in the thicker regions of the film as compared with the thinner regions. Reference may be made to said patent application Serial No. 635,982 for further details as to a suitable swelling agent and method of applying same. The film may then be dried, fused and stripped from the carrier, without applying any fabric layer. It will as a result have portions in relief on one side, and relatively deep undulations opposite said portions, but little or no undulations opposite other regions.

A modified method for using an embossed carrier to obtain a two-toned film is as follows. Instead of applying the first, colored, film-forming substance to only the high points of the embossed carrier, this first substance may be applied to all parts of the carrier by means such as a reverse roller coater, and doctored off of the high points of the carrier by suitable means, such as a felt roller or a doctor knife, leaving film-forming substance in only the low points of the carrier. After this substance is dried, one or more continuous layers of film-forming substance of a different color may be cast thereover, along with a layer of fabric, if desired. After the article is dried, fused and stripped, the surface which was next to the carrier will have a two-toned appearance. The high points of the film will comprise relatively thin layers of a differently colored substance from the remainder of the film.

It is to be understood that while the present discussion has described the use of a fabric web as a reinforcing layer for the film, other types of reinforcing layers could be used instead, such as for example calendared plastic sheets.

In a still further embodiment of the present invention, a fabric reinforcing web may be used which bears a decorative printed design, and the film formed on the embossed carrier may be relatively transparent, so that the pattern may be seen through the film.

While a suitable form of apparatus and mode of procedure, to be used in accordance with the invention, and various improved products resulting therefrom have been described in some detail, and certain modifications have been suggested, it will be understood that numerous changes may be made without departing from the general principles and scope of the invention.

We claim:

1. A method of producing a flexible vinyl film having a two-toned irregular surface, comprising the steps of applying a fluid substance including a vinyl resin to only the high regions of an embossed surface of an advancing flexible carrier, so as to leave exposed the low regions of said surface, drying said substance on said high regions, said surface being only lightly adhesive to vinyl resin when the latter is dried thereon, forming over said exposed low regions of said surface and over said dried, first-applied substance on said high regions a continuous layer of a film-forming dispersion comprising a vinyl resin, a plasticizer, and a diluent, said dispersion being sufficiently inert in relation to said dried first-applied substance not to dissolve same and destroy the pattern thereof, and being colored differently from said first-applied substance, drying said layer, bonding said dried layer permanently to said dried first-applied substance by heating them to a fusing temperature, and stripping said layer together with said first-applied substance from said carrier by applying tension to said layer in a direction away from said carrier.

2. A method of producing a flexible, vinyl film having a two-toned irregular surface comprising the steps of applying a fluid substance including a vinyl resin to only the high regions of an embossed surface of an advancing flexible carrier, so as to leave exposed the low regions of said surface, drying said substance on said high regions, said surface being only lightly adhesive to vinyl resin when the latter is dried thereon, forming over said exposed low regions of said surface and over said dried, first-applied substance on said high regions a continuous layer of a film-forming dispersion comprising a vinyl resin, a plasticizer, and a diluent, said dispersion being sufficiently inert in relation to said dried first-applied substance not to dissolve same and destroy the pattern thereof, and being colored differently from said first-applied substance, drying said layer, thereafter applying a layer of fabric to the exposed surface of said dried layer, applying heat to the surface of said fabric opposite said layer to bond and fuse said layer to said fabric, while maintaining said embossed carrier in contact with said layer, cooling said layer in contact with said carrier and said fabric, and stripping said layer together with said first-applied substance and said fabric from said carrier by applying tension in a direction away from said carrier.

3. A method of producing a flexible, decorative, sheet-like article comprising the steps of advancing a flexible carrier embossed in only selected areas in accordance with a fine pattern of a plurality of ridges and valleys in each of said areas, transferring to only the high points of said embossed areas of said carrier a first, colored, readily-driable film-forming substance including a vinyl resin, drying said substance, said carrier being only lightly adhesive to vinyl resin when the latter is dried thereon, applying directly over said dried substance in said embossed areas and over the exposed unembossed areas of said carrier at least one continuous layer of a film-forming dispersion of a second color, said dispersion comprising a vinyl resin, a plasticizer, and a diluent, said dispersion being sufficiently inert in relation to said dried first-applied substance not to dissolve same, drying said layer, fusing said layers and stripping same.

4. A method of producing a continuous, flexible, decorative, sheet-like web having an embossed front face and an undulated opposite face, comprising the steps of applying to a surface of an advancing flexible carrier embossed to have high regions and low regions a continuous layer of a fluid film-forming dispersion comprising a copolymer of vinyl acetate and vinyl chloride, a plasticizer, and a diluent, heating said dispersion sufficiently to partly dry same, applying a swelling agent comprising an organic solvent for said copolymer uniformly over substantially the entire exposed surface thereof, whereby to produce undulations in said exposed surface thereof, completing the drying of said layer, fusing said layer, and thereafter stripping same from said carrier.

5. A method of producing flexible film having on one face an undulated area the boundaries of which conform with a desired configuration, comprising the steps of embossing an advancing, flexible carrier so as to produce certain markedly depressed regions, applying at least one layer of a film-forming substance thereover so as to have an approximately even upper surface, said substance comprising a dispersion of a copolymer of vinyl acetate and vinyl chloride, a plasticizer, and a diluent, applying a swelling agent comprising an organic solvent for said copolymer uniformly to all parts of the exposed surface of said layer in order to produce visible undulations only in the thicker regions when the carrier is depressed, drying and fusing said layer, and stripping same from said carrier.

MARC A. CHAVANNES.
LEON E. MAGOON.

REFERENCES CITED

The following references are of record in the file of this patent:

UNITED STATES PATENTS

| Number | Name | Date |
|---|---|---|
| 986,162 | Gare | Mar. 7, 1911 |
| 1,733,469 | Rogers | Oct. 29, 1929 |
| 1,876,432 | Phillips | Sept. 6, 1932 |
| 1,920,118 | Walsh | July 25, 1933 |
| 1,961,025 | Wickham | May 29, 1934 |
| 2,144,388 | Quasebarth | Jan. 17, 1939 |
| 2,273,700 | Feuerstein | Feb. 17, 1942 |
| 2,326,001 | Ariotti | Aug. 3, 1943 |

FOREIGN PATENTS

| Number | Country | Date |
|---|---|---|
| 500,298 | Great Britain | Feb. 7, 1939 |